United States Patent Office 3,288,727
Patented Nov. 29, 1966

3,288,727
ADHERENT POLYMERS OF 3,3-BIS-(CHLORO-METHYL) OXETANE CONTAINING A NITROSO COMPOUND
Douglas S. Richart, Reading, Pa., assignor to The Polymer Corporation, a corporation of Pennsylvania
No Drawing. Filed Aug. 9, 1965, Ser. No. 478,477
2 Claims. (Cl. 260—2)

This application is a continuation-in-part of my application Serial Number 218,104, filed August 20, 1962, now abandoned, and relates to improved polymeric materials and, more particularly, to coating materials having improved adhesion to substrates.

The coating materials with which this invention is concerned are the chlorinated polyethers polymerized from 3,3-bis(chloromethyl)oxetane which results in the following molecular structure:

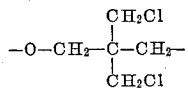

The preparation of this polymer is disclosed in detail in, for example, U.S. Patent 2,722,340 and it is sold under the trademark "Penton" by Hercules Powder Company. These resins have excellent resistance to attack by most corrosive chemicals and organic solvents and are, therefore, useful as coating materials for various processing equipment such as tanks, reaction vessels, pipe lines and the like, where corrosion may be a problem.

Quality coatings for the protection of metal articles from corrosion should be tightly adhered to the article. When coating articles by means of various heat fusion coating processes with the polyether resins with which this invention is concerned, poor maintenance of adhesion under adverse service conditions is generally observed. Conventional primers do not improve the results, probably due to the chemical inertness of the polyether resin. Present methods for providing prolonged adhesion of these resins to the substrate under adverse service conditions usually rely upon mechanical bonding or interlocking as can be achieved by chemically etching or sandblasting the surface of the substrate, but these techniques leave much to be desired.

Accordingly, it is the object of this invention to provide polyether coating resins that will adhere tightly to the substrates to which they are applied.

Briefly, the object of this invention is achieved by mixing certain chemical compounds into the polyethers with which this invention is concerned. Greatly improved adhesion is observed when minor quantities (from about ¼% to about 10%) of certain compounds selected from the class consisting of nitrogen-containing compounds, anhydrides, phenol/aldehydes and urea/aldehydes are mixed with these resins.

In the following example, a steel panel 1″ x 4″ x ⅛″ was thoroughly cleaned by sandblasting and then coated with the chlorinated polyether sold under the tradename "Penton" to which the indicated compound was mixed. (All percentages are by weight.) In the example a panel was coated in a fluidized bed of the prepared resin by heating the panel for 20 minutes at 600° F., immersing it in the fluidized bed for about 10–20 seconds and then placing it in a postheat oven at 525° F. for about 4 minutes. A smooth continuous film of about 15 to 20 mils was fused uniformly over the surface of the panel.

The comparative degree of adhesion was determined by placing the sample so obtained in boiling water and measuring the time until adhesion had been lost to such an extent that a knife blade could be inserted under the coating and the coating lifted away from the substrate. It was also determined by coating control samples that loss of adhesion normally occurs in 4 hours or less if none of the compound is mixed with the polyether resin.

Example

4% of a 30% blend of active N,4-dinitroso-N-methylaniline (sold under the trademark "Elastopar" by the Monsanto Company) was added to the chlorinated polyether. Adhesion was maintained for 120 days at which time the test was discontinued.

In addition to the N,4-dinitroso-N-substituted analine of the example, the following mono and di nitroso compounds have been found useful in promoting adhesion:

N-methyl-4-nitrosoaniline
2-methyl-4-nitrosophenol
N-methyl-N-nitroso-p-toluenesulfonamide
N-nitrosocarbazole
N-nitrosodimethylamine
4-nitrosodiphenylamine
N-nitrosopiperidine
1-nitroso-4-(p-nitrosophenyl)piperazine
N,N′-dinitroso-N,N′-bis-(p-nitrosophenyl)ethylene-diamine
N-ethyl-N,4-dinitroso-m-phenetidine.

I claim:
1. An adherent coating composition comprised of a major portion of a resinous binder of a chlorinated polyether prepared from 3,3-bis(chloromethyl)oxetane having the recurring structure:

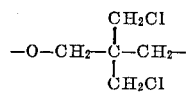

and from about ¼% to about 10% by weight of a mono nitroso compound selected from the group consisting of:

N-methyl-4-nitrosoaniline
2-methyl-4-nitrosophenol
N-methyl-N-nitroso-p-toluenesulfonamide
N-nitrosocarbazole
N-nitrosodimethylamine
4-nitrosodiphenylamine, and
N-nitrosopiperidine.

2. An adherent coating composition comprised of a major portion of a resinous binder of a chlorinated polyether prepared from 3,3-bis(chloromethyl)oxetane having the recurring structure:

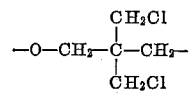

and from about ¼% to about 10% by weight of a dinitroso compound selected from the group consisting of:

1-nitroso-4-(p-nitrosophenyl)piperazine
N,N′-dinitroso-N,N′-bis-(p-nitrosophenyl)ethylene-diamine
N-ethyl-N,4-dinitroso-m-phenetidine, and
N,4-dinitroso-N-methylaniline.

References Cited by the Examiner
UNITED STATES PATENTS
2,722,487  11/1955  McTigue _____ 260—2

SAMUEL H. BLECH, Primary Examiner.